(12) United States Patent
Orr et al.

(10) Patent No.: US 7,622,824 B2
(45) Date of Patent: Nov. 24, 2009

(54) DISTRIBUTED POWER SUPPLY ARRANGEMENT

(76) Inventors: Raymond K. Orr, 21 Reaney Court, Kanata, Ontario (CA) K2K 1W7; Yan-Fei Liu, 1064 Earnhart Street, Kingston, Ontario (CA) K7P 3C2

( * ) Notice: Subject to any disclaimer, the term of this patent is extended or adjusted under 35 U.S.C. 154(b) by 395 days.

(21) Appl. No.: 10/725,526

(22) Filed: Dec. 3, 2003

(65) Prior Publication Data
US 2004/0124713 A1     Jul. 1, 2004

Related U.S. Application Data

(60) Provisional application No. 60/430,643, filed on Dec. 4, 2002.

(51) Int. Cl.
*H02J 1/00* (2006.01)
*H02J 9/00* (2006.01)

(52) U.S. Cl. .......................... 307/69; 307/23
(58) Field of Classification Search ............... 307/69, 307/18, 23, 43
See application file for complete search history.

(56) References Cited

U.S. PATENT DOCUMENTS

| | | | | |
|---|---|---|---|---|
| 3,909,702 A * | 9/1975 | Hart | ............... | 323/266 |
| 4,032,830 A | 6/1977 | Buonavita | ............... | 363/25 |
| 4,164,661 A | 8/1979 | Hucker et al. | ............... | 307/57 |
| 4,270,165 A | 5/1981 | Carpenter et al. | ............... | 363/65 |
| 4,538,073 A * | 8/1985 | Freige et al. | ............... | 307/33 |
| 5,952,733 A * | 9/1999 | Johnston | ............... | 307/44 |
| 5,956,244 A * | 9/1999 | Rehm et al. | ............... | 363/70 |
| 5,982,645 A * | 11/1999 | Levran et al. | ............... | 363/37 |
| 5,982,971 A * | 11/1999 | Amirkalali | ............... | 385/135 |
| 6,121,693 A * | 9/2000 | Rock | ............... | 307/18 |
| 6,137,345 A * | 10/2000 | Kaneko et al. | ............... | 327/538 |
| 6,373,671 B1 * | 4/2002 | Watanabe et al. | ............... | 361/93.8 |
| 6,614,133 B2 * | 9/2003 | Belson et al. | ............... | 307/58 |
| 6,768,225 B2 * | 7/2004 | Chang et al. | ............... | 307/65 |
| 6,856,047 B2 * | 2/2005 | Murabayashi et al. | ....... | 307/150 |

OTHER PUBLICATIONS

Z. Ye, D. Boroyevich, K. Xing & F.C. Lee; "Design of Parallel Sources in DC Distributed Power Systems by Using Gain-Scheduling Technique"; Power Electronics Specialists Conference, 1999, Pesc 99. 30$^{th}$ Annual IEEE Charleston, SC, USA Jun. 27-Jul. 1, 1999, Piscataway, NJ USA, IEEE, US, Jun. 27, 1999, pp. 161-165 XP010346890.

* cited by examiner

*Primary Examiner*—Albert W Paladini
*Assistant Examiner*—Michael Rutland Wallis (57) ABSTRACT

A plurality of power sources (26) supply power to a plurality of loads (24) via a distribution network (20, 22). Voltage is sensed at one or more points (28) in the network to provide a closed loop for regulating current or power supplied by the power sources, thereby allowing for voltage drops due to resistance of the distribution network. The loads may be low voltage integrated circuit devices on a printed circuit board (10), the distribution network may comprise power and ground planes of the board, and the power sources may be switch mode power converters on the board and providing regulated output currents.

12 Claims, 4 Drawing Sheets

DISTRIBUTED POWER SUPPLY ARRANGEMENT

This application claims the benefit of U.S. Provisional Application No. 60/430,643 filed Dec. 4, 2002, the entire contents and disclosure of which are hereby incorporated herein by reference.

This invention relates to power supply arrangements, and is particularly concerned with a distributed power supply arrangement in which a plurality of DC power sources are provided for supplying power to a plurality of loads.

By way of example, the loads may each comprise one or more integrated circuits on a printed circuit board (PCB) or circuit card, and/or they may comprise different parts of a single integrated circuit within the integrated circuit, and the plurality of power sources may be distributed on the circuit card, provided separately from the circuit card, and/or provided within the single integrated circuit. However, the principles of the invention are applicable regardless of the numbers and scale of the power sources and loads.

The principles of the invention are also applicable to other situations than the powering of integrated circuits. For example, the invention may also be applied to a distributed heating and/or cooling arrangement in which a plurality of heaters or coolers constitute loads which are controlled in dependence upon sensed temperature(s), for example to maintain a substantially constant temperature over a heated and/or cooled area, which may for example comprise an area occupied by charge-coupled devices, or optical modules, etc.

The principles of the invention can also be applied in non-electrical fields, for example in a fluid model in which the power sources are constituted by fluid sources and the loads are constituted by fluid drains.

For convenience, the invention is described below primarily in the context of supplying power to integrated circuits on a PCB on which the power sources are provided.

BACKGROUND

When electrical power is supplied to one or more loads via conductors, the conductors constituting a power distribution network which may for example comprise a conductive grid or a continuous conductive plane, voltage drops arise as a result of the load current flowing through the resistance of the distribution network. These voltage drops reduce the accuracy with which a desired power supply voltage is supplied to each load. Each voltage drop is proportional to the load current, so that the problem of power supply voltage regulation increases with increasing load current.

There is a continuing trend in integrated circuits, and in electronic equipment generally, towards progressively lower power supply voltages, for example to about 1 volt or less, and towards higher load currents, for example of many amps. Such high load currents increase the problem of power supply voltage regulation discussed above. In addition, in view of the low power supply voltages the voltage drops that occur constitute a relatively higher proportion of the desired power supply voltage, thereby exacerbating this problem so that it becomes much more serious.

It is known to improve power supply voltage regulation by sensing the power supply voltage at a point close to a load and by using the sensed voltage information to adjust a source of the power supply voltage, for example a power supply having a regulated output voltage, so that the voltage at the sensing point is substantially constant. This is referred to as remote sensing, because the sensing point is located at the load, i.e. distant or remote from the output of the power source itself, even though the actual distance may be small.

In the case of many loads distributed spatially along a power distribution bus constituting the distribution network, remote sensing cannot eliminate the problem for all of the loads because the sensing takes place only at one point along the distribution bus. In the case of loads distributed in two or three dimensions, for example several loads constituted by integrated circuits on a printed circuit board (PCB), remote sensing can reduce the problem of power supply voltage regulation to a degree, but it cannot fully compensate at all load points.

This problem increases as power supply voltages decrease and as current increases, as is the present trend for power supply voltages for digital integrated circuits. For example, with progressively higher resolution integrated circuit technology (e.g. 0.35 µm down to about 1 µm and less) power supply voltages are reduced (e.g. from about 3.3 volts to about 1.0 volt or less) in order to avoid problems such as tunneling effects and electrical field breakdown. The lower the power supply voltage, the greater is the relative proportion of a given voltage drop in the power distribution network. Further, such lower power supply voltages may typically be accompanied by corresponding increases in load current, further increasing the voltage drops in the power distribution network.

This problem is further increased in situations where the power distribution network uses conductors with a relatively high resistance. For example this may be the case for distribution of power across the surface of a silicon integrated circuit die, or in a multi-layer PCB in which the thickness of copper layers, including power and ground planes or layers, may be restricted by the number of layers and by minimum trace width requirements. The resistance of the power and ground planes may be further increased by the interruption of these planes by many vias in the PCB.

A known approach to reducing this problem is to use large, low-resistance conductors to distribute power. For example, on a circuit card a plurality of spaced bus bars of substantial size and relatively low resistance may be provided. These bus bars may extend across the card to convey the power supply voltage to multiple points on the card. The bus bars are supplied with the power supply voltage from the power source, for example a regulated voltage power supply on the circuit card, via a further bus bar also of substantial size and positioned at an edge of the card. On a smaller scale, within an integrated circuit, multiple bond wire connections can be provided around the edge of the power plane and, in some cases, to wire-bond to the power plane at interior points of the integrated circuit.

This approach reduces the problem but does not eliminate it, and can introduce other problems due to the size and number of bus bars or bond wires which may be required, and the space that is required for these and their connections.

It is also known, for current sharing purposes and especially to provide redundancy of power supplies in electrical equipment, to provide two power supplies for supplying a power supply voltage to a power supply voltage path. For example, in an equipment rack with a back-plane carrying such a power supply voltage path for connection to a plurality of circuit cards which may be inserted into sockets on the back-plane, a regulated voltage power source may be provided at each side of the equipment rack, i.e. at each end of the power supply voltage path. A voltage sensing point for use in a feedback control loop of the power sources may be provided at a mid-point of the power supply voltage path. In normal operation of such an arrangement load current for other circuit cards connected to the back-plane is shared between the two regulated voltage power sources, and the presence of the two power sources provides redundancy for the power supply. Such an arrangement does not provide a solution for the problem discussed above.

SUMMARY OF THE INVENTION

One aspect of this invention provides a distributed power supply arrangement comprising a plurality of power sources for supplying power to a plurality of loads via a power distribution network, the power sources and the loads being connected to the power distribution network whereby the power sources are coupled to the loads via respective resistances of the power distribution network, the arrangement further comprising at least one voltage sensor for sensing voltage at at least one point in the power distribution network, wherein each of the power sources is responsive to the sensed voltage for supplying a regulated current or a regulated power to the power distribution network.

The arrangement preferably comprises a plurality of said voltage sensors for sensing voltages at a plurality of points in the power distribution network, and each of the power sources can be responsive to an average of the sensed voltages for supplying said regulated current or regulated power to the power distribution network.

Conveniently the power sources comprise regulated current sources, which can be arranged for supplying regulated currents to the power distribution network with different relative weights. The power distribution network can comprise power and ground planes of a circuit card on which the loads are provided, in which case preferably the plurality of power sources are also arranged on the circuit card.

Desirably the power sources comprise switch mode power converters, the arrangement further including a control unit for controlling the power sources to operate in synchronism with different phases.

Another aspect of this invention provides a method of regulating voltage in a power distribution network including a plurality of power sources for supplying power to a plurality of loads, comprising the steps of: sensing voltage at at least one point in the power distribution network; and regulating currents supplied by the plurality of power sources to the power distribution network in dependence upon the sensed voltage.

A further aspect of the invention provides a power supply arrangement comprising a plurality of power sources each arranged for supplying power via a power distribution network to each of a plurality of loads, and at least one sensor for sensing a parameter of the arrangement for regulating the power supplied to the power distribution network from the plurality of power sources.

The power sources can comprise regulated current sources, and each sensor can comprise a voltage sensor for sensing voltage at a respective point in the power distribution network. Alternatively, said parameter can comprise a temperature at a respective point in the power distribution network. The arrangement preferably comprises a plurality of said sensors each for sensing said parameter at a respective one of a plurality of points in the power distribution network. The power supply arrangement can alternatively have a fluid form in which the power sources comprise fluid sources and the loads comprise fluid drains.

The use of a plurality of power sources to improve voltage regulation with current sharing ensures that currents are balanced in a desired manner (e.g. equally or in accordance with a desired weighting), without power flowing out of one power source and into another when loads are light. The current sharing has the effect of forcing the voltage up in regions of the distribution network or grid where nearby loads are drawing less power, while allowing the grid potential to sink at points where loads are drawing more power. It also has the added benefit of maintaining more even current flows in the grid. This reduces the difference between minimum and maximum potentials in the grid.

In comparison to known arrangements in which there is a specific path from a power source to a load, the spatial distribution of a plurality of power sources and loads and the current sharing among the power sources in embodiments of this invention have the result that current flows from the power sources to the loads in multiple directions, more effectively using electrically parallel conductive paths and thereby reducing current density peaks.

Sensing the potential at multiple points in the grid and regulating an average sensed potential forces the average potential in the sensed region of the grid to be constant and reduces any spatial dependence relative to a single sense point. Further improvement in regulation can be made by weighting the power source current ratios for power sources close to sense points where the potential is approaching a preset maximum or minimum. This is useful in regions of the grid where loads may vary from near zero to a peak value which substantially exceeds the average.

BRIEF DESCRIPTION OF THE DRAWINGS

The invention will be further understood from the following description by way of example with reference to the accompanying drawings, in which.

DETAILED DESCRIPTION

Figure 1:
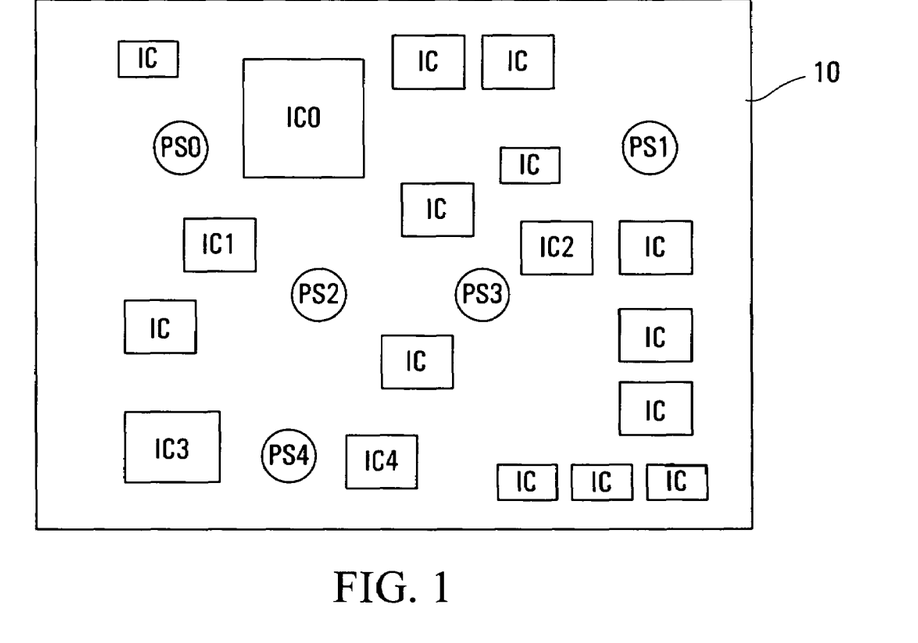
FIG. 1 schematically illustrates a layout of power sources and integrated circuits on a circuit card or printed circuit board (PCB)

In FIG. 1, a layout of devices on a printed circuit card or board 10 is illustrated by way of example. The PCB layout includes various integrated circuit devices (ICs), five of which are referenced IC0 to IC4 and the others of which are referenced IC, represented by rectangles in the respective positions of these ICs on the PCB. The PCB layout also includes in this case five power sources referenced PS0 to PS4, represented for clarity by circles in respective positions on the PCB, although the power sources may be of any size and shape.

The PCB 10 is a multi-layer board, including at least one ground plane and at least one power plane as well as one or more signal planes, arranged in multiple layers in a known manner. The power plane provides a supply voltage to the ICs, and the ground plane provides a return path for this supply, whereby the ICs are supplied with power at the desired supply voltage from the power sources. Accordingly, via the power plane and the ground plane all of the power sources PS0 to PS4 are effectively connected in parallel for providing substantially the same supply voltage to all of the ICs, also connected in parallel.

The power sources are arranged on the PCB 10 in positions that are intended to optimize the current flow in the power and ground planes. In the PCB layout of FIG. 1, for example, it is assumed that the ICs IC0 to IC4 constitute relatively high current loads, in comparison to the other ICs. Accordingly, the power sources PS0 to PS4 are arranged on the PCB 10 in positions for conveniently supplying these loads.

Figure 2:
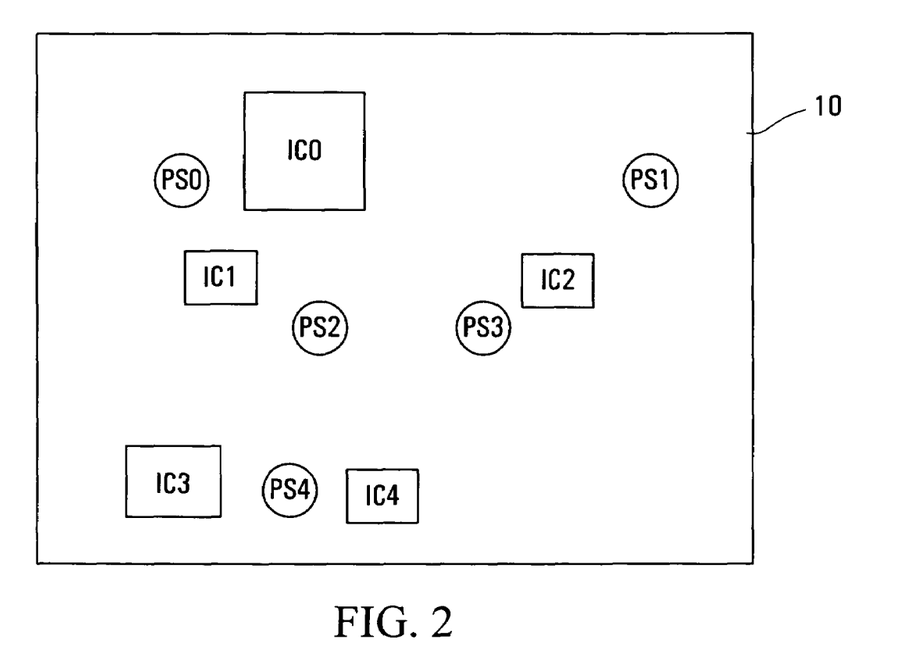
FIG. 2 schematically illustrates a simplification of the PCB layout of FIG. 1.

This is illustrated more clearly in FIG. 2, which shows the same PCB layout as FIG. 1 but with the relatively light loads, constituted by the ICs referenced IC in FIG. 1, omitted. Thus FIG. 2 shows only the ICs IC0 to IC4 and the power sources PS0 to PS4 on the PCB 10.

It will be appreciated that the number of ICs constituting high current loads, the number of other ICs, the number of power sources, the respective load currents, and the positions of devices on the PCB are all variable, and that the numbers and arrangement given here are only by way of example.

It will also be appreciated that this description assumes that all of the ICs are supplied with the same supply voltage. Different supply voltages can be provided from respective power sources via different power planes, and the principles of the invention described herein can be similarly applied for one or more of the power planes.

In a known arrangement, the PCB 10 would include only one power source for providing a power supply voltage to the power plane. For example, in a known arrangement the power source can be a switch mode power converter for providing the regulated supply voltage to the power plane.

Typically, a switch mode power converter providing a low output voltage may have a set point tolerance, or variation from its nominal output voltage, of ±3%. This tolerance includes initial accuracy and variations due to input, load, and temperature conditions and aging. However, the voltage actually supplied to each load is also subject to other variations.

For example, this voltage is also subject to a distribution voltage drop, this being the DC voltage difference between the output of the power converter and the voltage at the load. As discussed in the Background above, this voltage drop, which includes voltage drops in both the power plane and the ground plane, depends upon the load current and the characteristics of the power supply paths. By way of example, there may be a distribution voltage drop of up to 15 mV, or 1.5% for a supply voltage of 1 volt, for a load current of 50 amps.

In addition, the output voltage of the power converter is subject to ripple due to the switching of the converter, and to variation due to dynamic load response, i.e. voltage change due to sudden changes of load. The output ripple may typically be ±1.5% for a supply voltage of 1 volt, and the dynamic load response may typically be a 3% deviation for a 10% load step at 2.5 amps/second.

In combination, these variations may be up to 90 mV, or 9% of a nominal 1 volt supply voltage. However, it may be desired to power the IC loads from a supply voltage with a tolerance much less than this, for example ±5% or 50 mV for a 1 volt supply. Such accuracy can not be achieved with a known arrangement with the tolerances discussed above.

It can also be appreciated that, in a known arrangement using a plurality of power sources as described above, different distribution voltage drops may occur at different parts of the supply voltage distribution network (i.e. power and ground planes) and at different times due to load currents varying over time. In view of such variations and the tolerances discussed above, different ones of the plurality of power sources may supply different load currents to different ICs even though they are connected in parallel via the power plane, resulting in an imbalance of loading among the power sources.

The invention addresses these difficulties by providing a plurality of power sources, e.g. the power sources PS0 to PS4 in FIGS. 1 and 2, as regulated current sources, rather than regulated voltage, power sources. Alternatively, the power sources can be controlled to provide a regulated power output.

Figure 3:
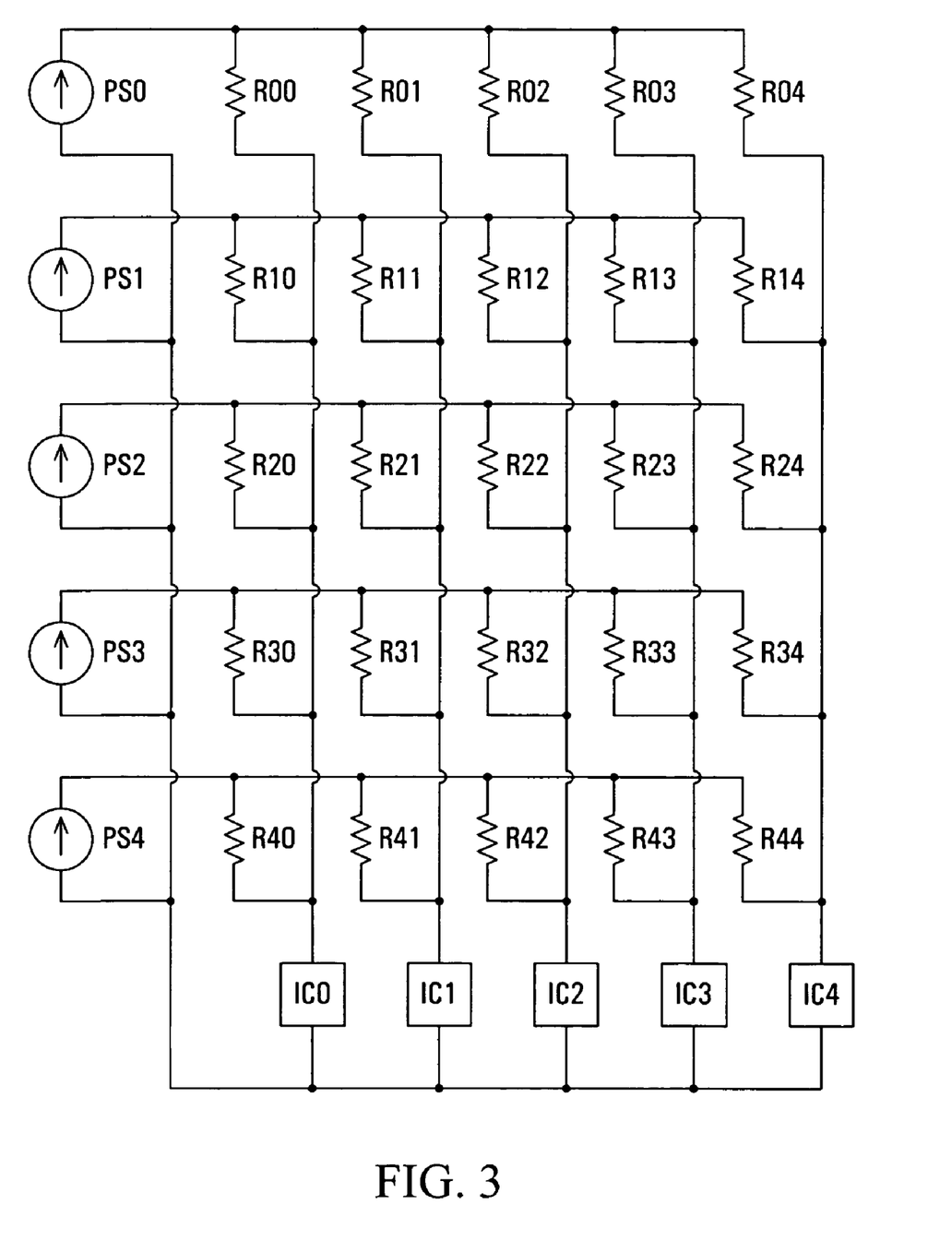
FIG. 3 schematically illustrates an equivalent circuit of a power distribution network constituted by the power sources, integrated circuits, and power and ground planes of the PCB layout of FIG. 2.

FIG. 3 schematically illustrates an equivalent circuit of the distribution network constituted by the power sources PS0 to PS4, each of which is a regulated current source. as illustrated in FIG. 3, integrated circuit loads IC0 to IC4, and power supply paths constituted by the power and ground planes of the PCB 10 in FIG. 2. As illustrated in FIG. 3, each of the power sources PS0 to PS4 is connected to each of the ICs IC0 to IC4 via a respective resistor R00 to R04, R10 to R14, ... R40 to R44. In each case the resistor R00 to R44 represents as a lumped element the total resistance, between the power source and the load, of the power supply path and return path via the power and ground planes. This total resistance also includes, for example, resistance of vias for the power and ground plane connections and any short track on an outer layer of the PCB for connection to the IC, for example in the case of surface mount ICs.

It can be appreciated that the resistance values of the resistors R00 to R44 are generally different from one another and depend on the thicknesses of the power and ground planes, the relative positions of the respective power sources and loads, and the presence of vias in the PCB. In addition, these resistance values are dependent upon temperature, because the sheet resistivity of copper used for the power and ground planes varies with temperature, being about 30% higher at a temperature of 100° C. than at 200° C.

Figure 4:
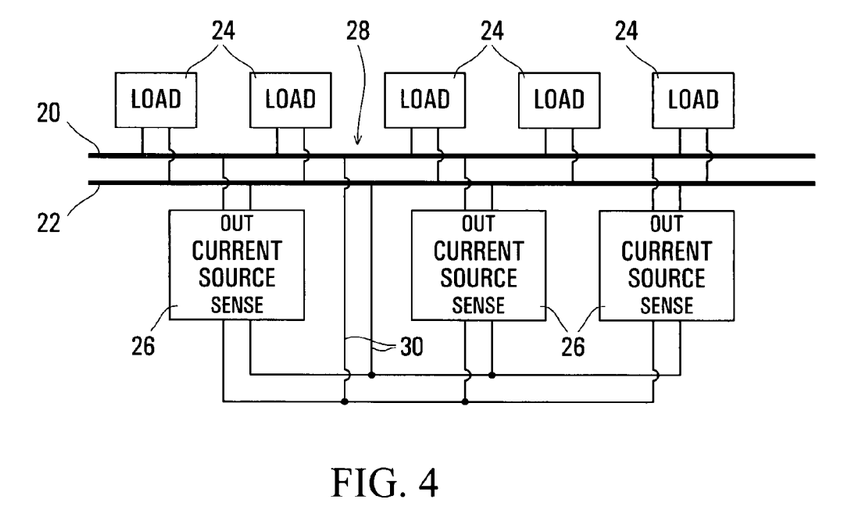
FIG. 4 represents interconnections, in a power distribution network similar to that of FIG. 3, using a single voltage sensing point.

For controlling the regulated current power sources PS0 to PS4, the power supply voltage between the power and ground planes can be sensed at one or more points of the PCB 10. FIG. 4 represents interconnections, in a power distribution network similar to that of FIG. 3, using a single voltage sensing point.

Referring to FIG. 4, the power and ground planes of the PCB 10 are represented by parallel connection buses 20 and 22 respectively. A plurality of loads 24, corresponding to the ICs as described above, are each connected to the buses 20 and 22 at respective points to receive a supply voltage. A plurality of current sources 26, corresponding to the power sources as described above and each providing a regulated current, have their outputs connected at respective points to the buses 20 and 22 to provide a power supply thereto. Voltage is sensed at a point 28 along the buses 20 and 22, representing voltage sensing at a desired location in the two dimensions of the PCB 10, by conductors 30 connected to the buses 20 and 22 at this point. The conductors 30 are connected to voltage sense input circuits 27 of each of the current sources 26 as a feedback control signal for controlling the output current of the respective current source 26.

Figure 5:
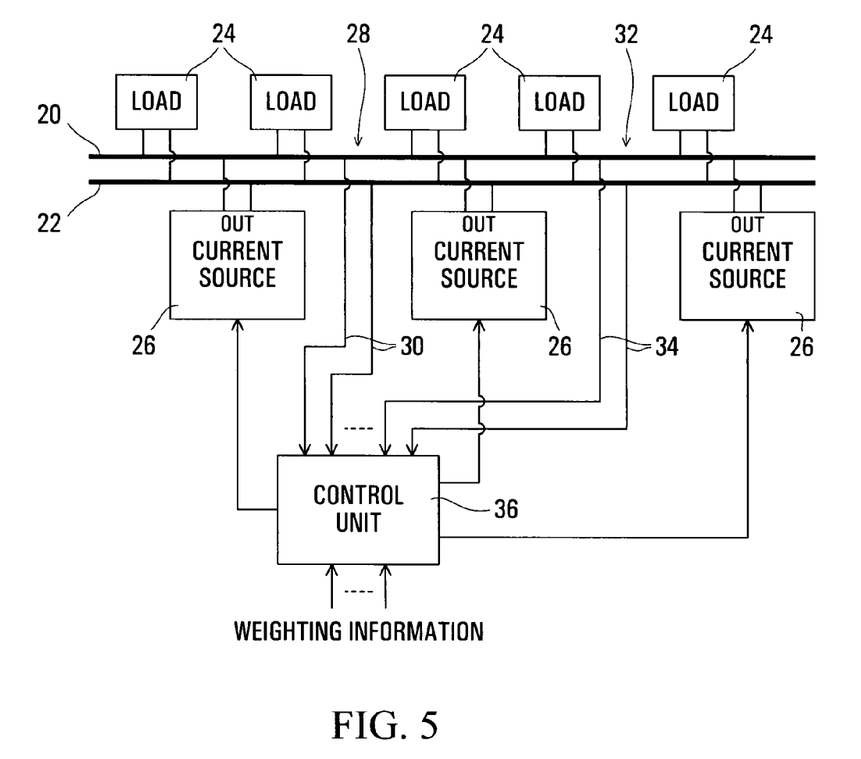
FIG. 5 represents interconnections, in a power distribution network similar to that of FIG. 3, using a plurality of voltage sensing points.

FIG. 5 illustrates, in a similar manner to FIG. 4 and using similar reference numerals, interconnections in the power distribution network using a plurality of voltage sensing points. FIG. 5 shows two voltage sensing points 28 and 32, from which conductors 30 and 34 extend to voltage sense input circuits 37 of a control unit 36 which is thereby supplied with the voltages at the respective points 28 and 32. The control unit 36 has outputs coupled to the current sources 26 for controlling and thereby regulating the currents produced by the current sources 26 and supplied to the power and ground planes 20 and 22. In addition, the control unit 36 can be supplied with weighting information for controlling relative weighting of the currents produced by the current sources 26, as further described below. For example, the control unit 36 can be a digital control unit, and the weighting information can be provided as information stored in a table in the control unit.

It will be appreciated that two or more such voltage sensing points can be provided in the manner represented in FIG. 5, and that these sensing points can be provided in any desired positions on the PCB 10. By way of example, the control unit 36 can provide a simple averaging of the voltages sensed at the plurality of sensing points, and can use the average sensed voltage to control all of the current sources 26 in a common manner. Alternatively, the control unit 36 can control one or more of the current sources 26 in an individual manner, in accordance with any desired function of one or more of the individual sensed voltages, with or without a separate weighting factor provided by the weighting information for the respective current source.

It can be appreciated that as described above the power supply distribution network provides an active current sharing arrangement in accordance with which the currents produced by the current sources 26, constituting the power sources PS0 to PS4, are controlled to maintain the voltage sensed at each sensing point at the desired level, the currents supplied by the current sources being maintained substantially equal or in accordance with a desired weighting. This has the effect of slightly raising the voltage between the power and ground planes in regions of the PCB 10 where loads are drawing a reduced power, lowering the voltage in regions where loads are drawing more power, and maintaining a more even current flow in different regions. This reduces the difference between maximum and minimum currents in the network, and therefore reduces the difference between maximum and minimum voltage. Supply voltage variation over the PCB 10 as a whole is thus reduced.

With weighting information provided to the control unit 36 as shown in FIG. 5, each current source can provide load currents in accordance with a desired weighting factor. Regulation can be further improved by using a dynamically variable weighting factor to provide, within limits that may be determined by the control unit 36, an unequal current sharing among the current sources 26. In this case the control unit 36 controls current sources close to sense points where the sensed voltage approaches a preset minimum value to supply a higher proportion of the total load current than current sources close to sense points where the sensed voltage approaches a preset maximum value. Such an arrangement can be particularly useful in situations where the load currents can vary over a wide range.

For example, if a particular region of the power distribution network has a relatively low voltage sensed by a sensor in that region, due to a heavy current flow to that region causing a relatively large voltage drop in the power distribution network, weighting of current supplied by a power source in or close to that region, thereby to increase the current that it supplies relative to the currents supplied by the other power sources, results in a relatively reduced voltage drop through the power distribution network for the region, thereby compensating for the heavy current flow and improving the regulation provided by the power supply arrangement over the power distribution network as a whole.

It will be appreciated that although the control unit 36 is shown separately from the current sources 26 in FIG. 5, each current source 26 may instead incorporate a corresponding control unit, responsive to a plurality of sensed voltages, in its control circuitry. Likewise, the arrangement of FIG. 4 may include a separate control unit for controlling the current sources, or a corresponding control unit in its control circuitry.

For any particular layout of loads on the PCB 10, it is desirable to determine a desirable number of power sources (e.g. 5 as shown in FIG. 2) and optimum positions for these. A finite element model of the distribution voltage drops in the power and ground planes can be used, or a simplified procedure can be used to develop a model of the power distribution network, as described below.

Initially, a reasonable number of current sources can be chosen with positions on the PCB 10 at which they have approximately equal distances from the nearest significant loads. For example, this provides the five sources PS0 to PS4 with their positions shown in FIGS. 1 and 2 as described above. For each current source and each significant load as shown in FIG. 3, the resistance of the respective one of the resistors R00 to R44 is then estimated in dependence upon the resistivity (ohms per square at a desired temperature) of the power and ground planes and a number of conductor squares between the respective source and load. For each load, the voltage drop due to the respective load current flowing through the respective resistance is then determined. If this voltage drop is greater than an allowable maximum, then an additional current source is needed.

For example, applying this procedure to the layout of the PCB 10 shown in FIG. 2 (i.e. omitting for simplicity the relatively light loads presented by the other ICs shown in FIG. 1), with half-ounce copper layers for the power and ground planes 20 and 22, gave values (in m $\Omega$) for the resistances of the resistors R00 to R44 as shown in the following Table 1:

TABLE 1

|  | IC0 | IC1 | IC2 | IC3 | IC4 |
|---|---|---|---|---|---|
| PS0 | R00 = 4.6 | R01 = 4.0 | R02 = 14.9 | R03 = 11.1 | R04 = 14.0 |
| PS1 | R10 = 13.8 | R11 = 17.0 | R12 = 5.1 | R13 = 21.4 | R14 = 15.8 |
| PS2 | R20 = 7.3 | R21 = 4.3 | R22 = 9.7 | R23 = 7.3 | R24 = 6.3 |
| PS3 | R30 = 10.6 | R31 = 10.9 | R32 = 3.5 | R33 = 13.2 | R34 = 7.2 |
| PS4 | R40 = 13.0 | R41 = 8.5 | R42 = 13.1 | R43 = 4.4 | R44 = 3.4 |

Assuming a supply voltage of 1 volt and a load current of 10 amps for each of the ICs IC0 to IC4, each load is modeled as a 100 m $\Omega$ resistance, and the voltage drops in the distribution network are calculated using node voltage analysis. Other IC load currents can be similarly modeled. With the five current sources regulated to supply equal currents of 10 amps each, the percentage voltage deviations from the nominal value of 1 volt at the respective current sources and IC loads are as shown in the following Table 2:

TABLE 2

| Source | PS0 | PS1 | PS2 | PS3 | PS4 |
|---|---|---|---|---|---|
| Deviation | +1.4% | +2.4% | +1.3% | +1.6% | +1.2% |
| Load | IC0 | IC1 | IC2 | IC3 | IC4 |
| Deviation | −0.2% | +0.1% | +0.3% | −0.3% | +0.05% |

As can be seen from Table 2, the voltage variation at the IC loads is restricted to a very small range of ±0.3% (±3 mV), whereas the voltages at the current sources are higher and up to 2.4% more than the nominal supply voltage of 1 volt. These higher voltages at the respective points on the PCB 10 may be acceptable (e.g. they may be within permissible limits for the current sources, voltage sensing, and any other ICs on the PCB 10).

Generally, however, there are other ICs on the PCB, for example the other ICs shown in FIG. 1, which require that the supply voltage over substantially all of the PCB 10 be as close as possible to the nominal supply voltage of 1 volt. In order to minimize deviation of the supply voltage from the nominal value over all of the power plane, the model is adjusted to center the regulation about the nominal supply voltage. Thus in the above example, the output voltages are offset so that the average of the maximum (±2.4%) and minimum (−0.3%) voltage deviations in Table 2 is zero, resulting in centered voltage deviations as shown by the following Table 3:

TABLE 3

| Source | PS0 | PS1 | PS2 | PS3 | PS4 |
|---|---|---|---|---|---|
| Deviation | +0.4% | +1.4% | +0.3% | +0.5% | +0.2% |
| Load | IC0 | IC1 | IC2 | IC3 | IC4 |
| Deviation | −1.2% | −0.9% | −0.7% | −1.4% | −1.0% |

While this detracts from the regulation at the heavy loads, it reduces the overall voltage deviation for the PCB to ±1.4% (14 mV for a nominal 1 volt supply).

Figure 6:
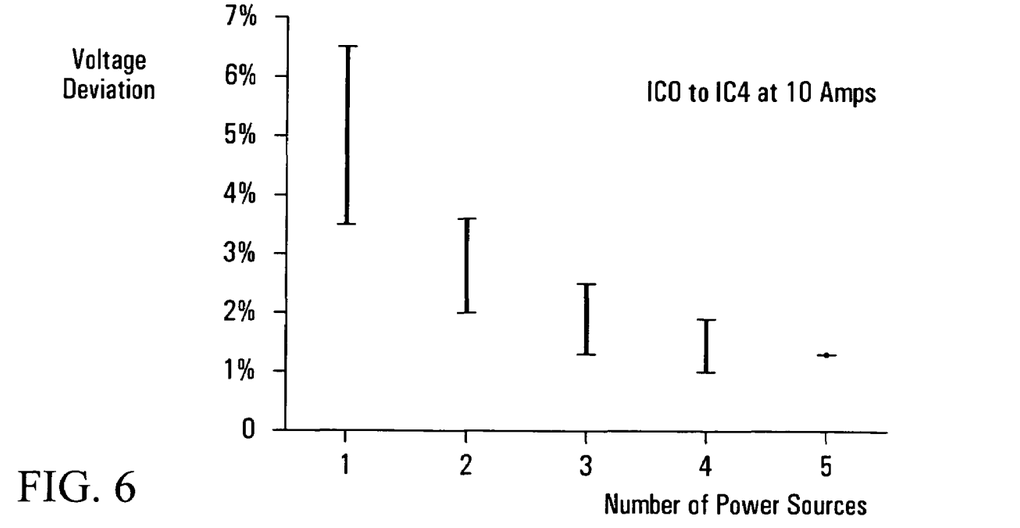
FIGS. 6 and 7 are graphs illustrating improvements in voltage regulation for different load conditions in the power distribution network of FIG. 3.

FIG. 6 is a graph illustrating how the voltage deviation discussed above changes for different numbers and different combinations of the power sources PS0 to PS4, assuming that all of the ICs IC0 to IC4 draw the same current of 10 amps and that this current is shared equally among the power sources that are used. As shown at the right of this graph, with all five power sources used the voltage deviation is about 1.4% as discussed above. Using only four of the power sources PS0 to PS4, the voltage deviation is from about 1% to about 2%, depending on which power source is not used. With only 3 or 2 of the power sources used, the voltage deviation increases, the actual deviations depending on the particular combinations of power sources in use. With only one power source used, the voltage deviation is in a range from about 3.5% (using the relatively centrally positioned PS2) to about 6.5% (using the relatively separated PS1, which has a position typical for known PCB layouts) as shown at the left of FIG. 6.

Figure 7:
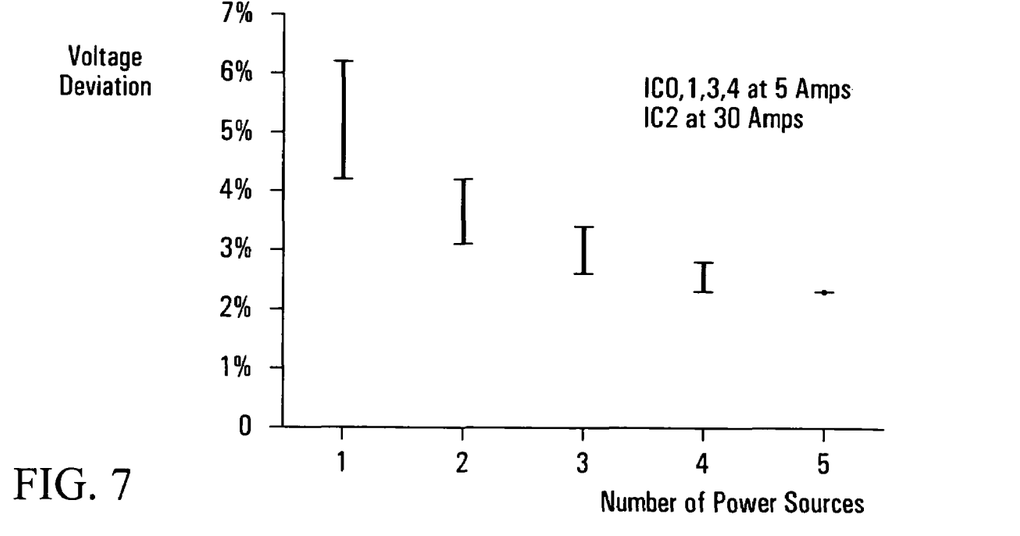

FIG. 7 is a graph similar to that of FIG. 6, but for a case in which the load current for the IC IC2 is increased to 30 amps and the load current for each of the ICs IC0, IC1, IC3, and IC4 is reduced to 5 amps. FIG. 7 also shows a progressive reduction in voltage deviation over the power plane as the number of power sources is increased from 1 to 5, with the actual voltage deviations depending on the combinations of power sources used in each case.

It can be appreciated from FIGS. 6 and 7 that one of the combinations of four of the power sources can provide voltage deviation results as good as, or better than, the results using all five of the power sources. In practice, even better results can potentially be achieved by enhancing the position of one or more of the power sources. For example, the PCB layout of FIGS. 1 and 2 can be enhanced by moving the power source PS1 to be closer to the loads IC0 and IC2.

The use of a plurality of power sources as described above provides further benefits with respect to set point tolerance, output ripple, and dynamic load response.

More particularly, the use of a plurality of power sources provides an averaging effect which reduces the overall set point tolerance. For example, a set point tolerance of 3% for a single power source is substantially reduced by this averaging effect, e.g. to about 2.3%, 2.0%, 1.75%, or 1.5% for two, three, four, or five power sources respectively.

Further, the plurality of power sources can be operated synchronously with staggered phases to significantly reduce the output ripple. For example, two power sources can be operated with a 180° phase difference and with their outputs effectively connected in parallel via the power and ground planes as described above. The ripple frequency is thereby increased to twice the power source switching frequency, and the output capacitance of the power sources is doubled, so that the output ripple is potentially reduced by a factor of 4. More generally, operating n power sources in parallel with sequential phase steps of 360°/n can theoretically (with practical limits due to second order effects) reduce the output ripple by a factor of $n^2$.

In the PCB layouts as described above the outputs of the plurality of power sources are not connected directly in parallel but are interconnected via the resistances of the power and ground planes. Consequently, the ripple is reduced by a smaller, but still significant, factor. More particularly, an output ripple of 1.5% for a single power source can be reduced to 0.5%, 0.3%, 0.25%, or 0.2% for 2, 3, 4, or 5 power sources respectively.

Similarly, the increased output capacitance provided by the plurality of power sources reduces changes in output voltage due to step or transient changes in load current, and such step changes are shared by the plurality of power sources so that they represent a smaller proportion of the total load current for any one power source. Accordingly, the use of the plurality of power sources also improves the dynamic load response of the overall power distribution network.

In addition, with current flows in multiple directions from the power sources to the loads, and hence multiple electrically parallel paths for the load currents, inductance of these paths in combination is reduced. Further, current changes are distributed among the multiple current flow paths, so that inductive voltage drops are also reduced. These factors further improve the dynamic response of the overall power distribution network.

In combination, these improvements enable the power supply voltage deviation over the PCB 10 to be substantially reduced. For example, with four of the power sources PS0 to PS4 and a nominal supply voltage of 1 volt the set point tolerance is reduced from 30 mV (3%) to 17.5 mV (1.75%) as discussed above, the output ripple is reduced from 15 mV (1.5%) to 2.5 mV (0.25%) as discussed above, the dynamic load response may be reduced from 30 mV (3%) to 20 mV (2%) or less, and the distribution voltage drop is reduced from 15 mV (1.5%) to 10 mV (1%) as shown in FIG. 6. Consequently, the total voltage deviation can be reduced to 50 mV (5%), compared with 90 mV (9%) in a known arrangement as discussed above.

It is observed that the use of the plurality of power sources as described above can facilitate reliability of the power supply arrangement through redundancy, by increasing the output ratings of the power sources. In addition, the synchronized and phase-staggered operation of the power sources as described above also reduces ripple reflected to an input voltage rail for the power sources, and can help to reduce conducted emissions from the PCB.

Although as described above the power sources are described and illustrated as regulated current sources, they can alternatively be constituted by power sources providing regulated output powers. The power sources can be implemented in any desired manner, for example they may be constituted by voltage sources controlled in dependence upon current sensing to operate as current sources in a current sharing scheme, or they can be current sources designed as such.

For control of the power sources as described above, it is desirable for each power source to be capable of responding to an average of a plurality of sensed voltages, to provide active current sharing which is operable under all conditions, including start-up and shut-down, and preferably to provide this current sharing in a weighted manner which can change dynamically in response to small changes in the sensed voltages. In addition, the power sources must be capable of being synchronized in frequency and controlled in phase to provide the ripple reduction described above. As described above, some or all of these aspects can be incorporated in a control unit such as the control unit 36 shown in FIG. 5.

It can be appreciated that the principles of the invention described above by way of example can be applied to arbitrary numbers and arrangements of power sources, loads, and power distribution networks, and to arbitrary environments. For example, although as described above the loads are constituted by integrated circuits on a PCB, they could instead be parts of a single integrated circuit device which may also include power sources, or they could be circuit cards in electronic equipment, or they could comprise any other loads, power sources, and/or environments.

In addition, although as described above the power distribution network is constituted by power and ground planes of a PCB, it could instead be constituted by a different arrangement of conductors, such as a conductive mesh or grid, or individual conductors for example in a star arrangement from each power supply to each load. In addition, although as described above the power sources are provided on the PCB in positions that are desirably close to the most significant loads, they could instead be provided separately from the PCB (e.g. on a parallel but separate PCB) with connections to the power and ground conductors on the PCB.

In a temperature control environment, a similar approach can be used to control temperature across a surface where multiple heaters or coolers are controlled to keep a constant temperature, heaters or coolers being controlled as constant power sources, and temperature being sensed at multiple points to provide information to set the power level to the heaters or coolers.

Furthermore, the principles of the invention can also be applied in non-electrical fields, for example in a fluid model in which the power sources are constituted by fluid sources and the loads are constituted by fluid drains.

Although particular forms of the invention and examples of variations and applications are described above, it can be appreciated that numerous other modifications, variations, and adaptations may be made without departing from the scope of the invention.

The invention claimed is:

1. A distributed power supply arrangement comprising:
a plurality of power sources for supplying power to a plurality of loads via a power distribution network, the power sources and the loads being connected to the power distribution network whereby the power sources are coupled to the loads via respective resistances of the power distribution network,
the arrangement further comprising at least one voltage sensor for sensing power supply voltage at at least one point in the power distribution network, wherein each of the power sources is responsive to the sensed power supply voltage sensed by each of the at least one voltage sensor for supplying a regulated current or a regulated power to the power distribution network, the arrangement comprising a plurality of said voltage sensors for sensing power supply voltages at a plurality of points in the power distribution network, whereby each of the power sources is responsive to the power supply voltages sensed at the plurality of points in the power distribution network.

2. An arrangement as claimed in claim 1 wherein each of the power sources is responsive to an average of the sensed power supply voltages sensed at the plurality of points in the power distribution network for supplying said regulated current or regulated power to the power distribution network.

3. An arrangement as claimed in claim 1 wherein the power sources comprise regulated current sources.

4. An arrangement as claimed in claim 3 wherein the power sources are arranged for supplying regulated currents with different relative weights to the power distribution network.

5. An arrangement as claimed in claim 1 wherein the power distribution network comprises power and ground planes of a circuit card on which the loads are provided.

6. An arrangement as claimed in claim 5 wherein the plurality of power sources are arranged on the circuit card.

7. A method of regulating voltage in a power distribution network including a plurality of power sources for supplying power to a plurality of loads, comprising the steps of:
sensing voltage of the supplied power at at least one point in the power distribution network; and
regulating current supplied by each of the plurality of power sources to the power distribution network in dependence upon the sensed voltage sensed at each of the at least one point in the power distribution network, wherein the voltage of the supplied power is sensed at a plurality of points in the power distribution network, and the current supplied by each of the plurality of power sources is regulated in dependence upon an average of the sensed voltages sensed at the plurality of points in the power distribution network.

8. A method as claimed in claim 7 wherein the currents supplied by the plurality of power sources are regulated to have different relative weights.

9. A method as claimed in claim 7 applied to a circuit card, wherein the loads comprise integrated circuits on the circuit card and the plurality of power sources comprise switch mode power converters on the circuit card.

10. A method as claimed in claim 9 wherein the power distribution network comprises power and ground planes of the circuit card.

11. A power supply arrangement comprising:
a plurality of power sources each arranged for supplying power via a power distribution network to each of a plurality of loads, and
at least one power supply voltage sensor for sensing a power supply voltage at a respective point in the power distribution network for regulating the power supplied to the power distribution network from the plurality of power sources, each of the power sources being responsive to the sensed power supply voltage sensed by each of the at least one power supply voltage sensor for supplying a regulated power to the power distribution network, the power supply arrangement comprising a plurality of said power supply voltage sensors each for sensing said power supply voltage at a respective one of a plurality of points in the power distribution network, whereby each of the power sources is responsive to the power supply voltages sensed at the plurality of points in the power distribution network.

12. A power supply arrangement as claimed in claim 11 wherein the power sources comprise regulated current sources.

* * * * *

UNITED STATES PATENT AND TRADEMARK OFFICE
CERTIFICATE OF CORRECTION

PATENT NO. : 7,622,824 B2 Page 1 of 2
APPLICATION NO. : 10/725526
DATED : November 24, 2009
INVENTOR(S) : Raymond K. Orr et al.

It is certified that error appears in the above-identified patent and that said Letters Patent is hereby corrected as shown below:

In the drawings, Sheet 3/4, Fig. 4 should appear as follows:

FIG. 4

Signed and Sealed this

First Day of June, 2010

David J. Kappos
Director of the United States Patent and Trademark Office

CERTIFICATE OF CORRECTION (continued)
U.S. Pat. No. 7,622,824 B2 and

In the drawings, Sheet 3/4, Fig. 5 should appear as follows:

FIG. 5

Column 6, line 14, cancel the "." after the word source;

Column 6, line 36, "200°C" should read --20°C--; and

UNITED STATES PATENT AND TRADEMARK OFFICE
CERTIFICATE OF CORRECTION

PATENT NO. : 7,622,824 B2  Page 1 of 1
APPLICATION NO. : 10/725526
DATED : November 24, 2009
INVENTOR(S) : Raymond K. Orr et al.

It is certified that error appears in the above-identified patent and that said Letters Patent is hereby corrected as shown below:

Title Page, Item [*]

Delete the phrase "by 395 days" and insert -- by 651 days --.

Signed and Sealed this

Twenty-fourth Day of August, 2010

David J. Kappos
*Director of the United States Patent and Trademark Office*